United States Patent [19]

Nakagawa et al.

[11] Patent Number: 4,835,564

[45] Date of Patent: May 30, 1989

[54] APERTURE CONTROL APPARATUS OF PROGRAMMING SHUTTER

[75] Inventors: Norifumi Nakagawa; Junichi Matsumoto, both of Tokyo, Japan

[73] Assignee: COPAL Company Limited, Itabashi, Japan

[21] Appl. No.: 137,322

[22] Filed: Dec. 23, 1987

[30] Foreign Application Priority Data

Dec. 26, 1986 [JP] Japan ............................ 61-200229[U]

[51] Int. Cl.$^4$ ........................ G03B 7/087; G03B 7/097
[52] U.S. Cl. .................................................. 354/435
[58] Field of Search ................ 354/435, 436, 437, 439, 354/440

[56] References Cited

U.S. PATENT DOCUMENTS

| | | | |
|---|---|---|---|
| 4,280,761 | 7/1981 | Ogawa et al. ........................ | 354/436 |
| 4,322,145 | 3/1982 | Yamada et al. ...................... | 354/435 |
| 4,354,748 | 10/1982 | Grimes et al. .................... | 354/437 X |
| 4,743,934 | 5/1988 | Yoshida et al. ...................... | 354/439 |

FOREIGN PATENT DOCUMENTS 2185586  7/1987  United Kingdom ................ 354/435

Primary Examiner—W. B. Perkey
Attorney, Agent, or Firm—Wenderoth, Lind & Ponack

[57] ABSTRACT

A drive current of a motor is controlled by an output of a pulse oscillator having a variable duty ratio in response to a shutter release operation. Shutter blades having the function of the diaphragm blade start to open the aperture for exposure in interlocked relationship with the rotation of the motor. The shutter blades are provided with a plurality of detection marks for use in detection of the shutter blade position, and every time each of the detection marks passes through a predetermined detection point, an aperture value detection circuit produces a detection pulse. Each of the detection pulses is supplied to an operation circuit which calculates a time interval between the detection pulses. The time interval between the detection pulses is compared with a reference time stored previously in a setting device so that the duty ratio of the output signal of the pulse oscillator in the next cycle of the detection pulse is controlled to control the rotational speed of the motor. Further, the duty ratio of the pulse oscillator is made equal to 100% so that the motive power at the initial operation is secured until the aperture value detection circuit produces a first detection pulse.

6 Claims, 5 Drawing Sheets

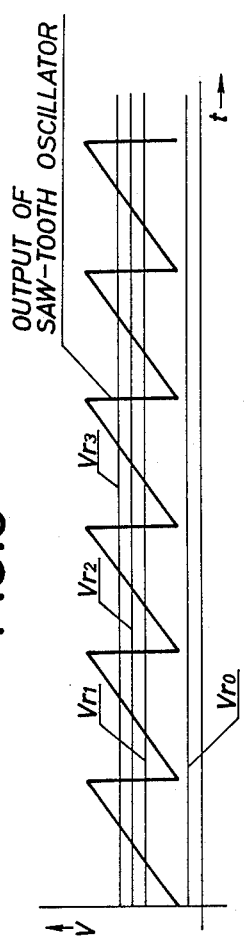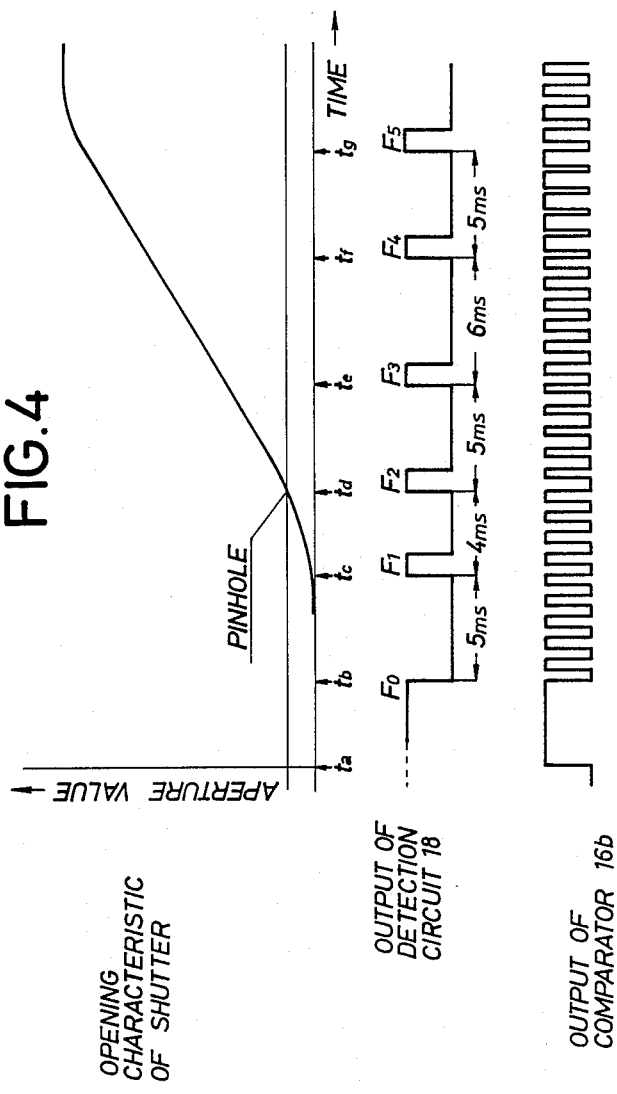

APERTURE CONTROL APPARATUS OF PROGRAMMING SHUTTER

BACKGROUND OF THE INVENTION

The present invention relates to an aperture control apparatus of a programming shutter.

The control operation of the programming shutter using shutter blades having the function of diaphragm blades is now described with reference to FIG. 6.

FIG. 6 shows a known opening characteristic curve of the programming shutter of this type, in which the abscissa represents time and the ordinate represents the aperture value.

At a time $t_1$ of FIG. 6, when the shutter is released, the shutter blades are opened gradually and a film begins to be exposed after a time $t_2$ that a pinhole is formed by the shutter blades. When an exposure finish time $t_3$ determined in accordance with a film speed and the brightness of a subject to be photographed is reached, the shutter blades are suddenly closed and the exposure operation is finished.

The programming shutter as described above requires the extremely stable opening characteristic of the shutter blades in order to maintain the exposure to be accurate. As a manner of stabilizing the opening characteristic of the shutter blades, a mechanism including a servo control system or a governor is known heretofore.

A conventional manner using the servo control system is now described.

An aperture value of the shutter blades is detected by a light receiving element of which a light receiving area is varied in accordance with the opening amount of the shutter blades and is fed back to a servo amplifier. The servo amplifier is supplied as a command value with a voltage signal similar to the opening characteristic curve shown in FIG. 6. Since the servo amplifier drives a servomotor for driving the shutter blades in accordance with a difference between the command value and the aperture value, the aperture value of the shutter blades follows the command value.

However, such a servo control system requires the expensive servo amplifier and servomotor. Further, in the case of an apparatus like a camera using a power source such as a battery having low reliability, an extremely high-degree circuit technique is required to produce the command value similar to the required opening characteristic curve.

In addition, when the mechanism including the governor for stabilizing the opening characteristic is employed, the control operation thereof is of open type and the exposure accuracy depends on a mechanical accuracy. Accordingly, the mechanism is complicated in order to obtain the sufficient accuracy. Particularly, since the photographing position of a camera is not fixed to change to various positions such as vertical position, horizontal position, overhead position, elevation position and the like and the weight distribution of mechanical members is varied in accordance with the positional variation, the mechanism is complicated in order to obtain sufficient accuracy in any photographing position.

SUMMARY OF THE INVENTION

The present invention is materialized in view of such circumstances and inconveniences as described above and an object of the present invention is to provide an aperture control apparatus of a programming shutter capable of stablilizing an opening characteristic of shutter blades without adoption of the complicated mechanism for stabilizing the opening characteristic and the servo control system requiring the high-degree circuit technique.

In order to achieve the above object, the aperture control apparatus of the programming shutter according to the present invention including a motor which rotates in response to a current supplied to the motor and a shutter blade having the function of the diaphragm blade and connected with the motor to open an exposure aperture in response to the rotation of the motor, comprises a plurality of detection marks provided on the shutter blade along a moving direction of the shutter blade to detect a position of the shutter blade, aperture value detection means for producing a detection pulse every time each of the plurality of detection marks passes through a predetermined detection point disposed in a traveling path of the plurality of detection marks, operation means for calculating a pulse interval of the detection pulses produced by the aperture value detection means every time the detection pulses are supplied thereto, a pulse oscillator having a variable duty ratio and for controlling turning on and off of a drive current of the motor and duty ratio control means for controlling the duty ratio of the pulse oscillator in accordance with the pulse interval of the detection pulses calculated by the operation means.

According to the present invention, the opening speed of the shutter blade corresponds to the duty ratio of the drive current of the motor. The pulse interval of the detection pulse produced by the aperture value detection means is varied in accordance with the opening speed of the shutter blade. Since the duty ratio of the motor for driving the shutter blade is controlled in accordance with the pulse interval, the opening speed of the shutter blade is corrected each time the detection pulse is produced and a stable opening characteristic can be obtained.

The detection point is disposed in a position in which the aperture value detection means produces a first detection pulse before a pinhole is formed by the shutter blade and the duty ratio control means controls the duty ratio of the output pulse of the pulse oscillator to 100% until the first detection pulse is produced so that the motor is driven by a direct current signal at the beginning of movement of the shutter and sufficient motive power required to an initial operation can be secured.

BRIEF DESCRIPTION OF THE DRAWINGS

FIG. 3 is a time chart of a pulse oscillator;

FIG. 4 is a time chart of the circuit shown in FIG. 2;

DETAILED DESCRIPTION OF THE PREFERRED EMBODIMENT

An embodiment of the present invention is now described in detail with reference to the drawings.

Figure 1:
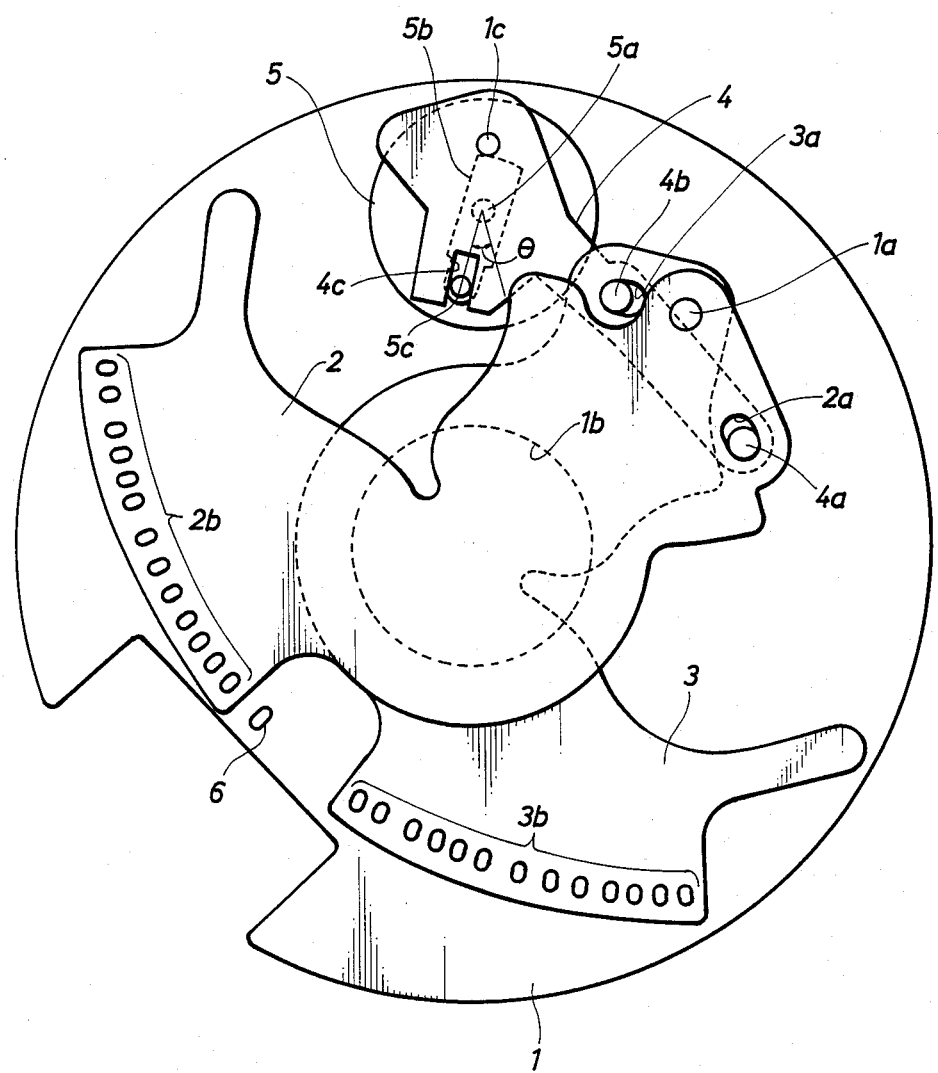
FIG. 1 schematically illustrates an exemplified shutter mechanism according to an embodiment of the present invention.

Referring to FIG. 1 illustrating an exemplified shutter mechanism to which the present invention is applied, shutter blades 2 and 3 are rotatably supported on an axis 1a mounted to a base plate 1 for the shutter. In the normal state of the shutter, an aperture 1b for the exposure formed in the base plate 1 is closed by the shutter blades 2 and 3.

An opening and closing lever 4 which swings the shutter blades 2 and 3 to open and close the aperture 1b is swingably mounted on an axis 1c provided at a given position with respect to the base plate 1. A boss 4a fixedly mounted near an end of the lever 4 is engaged with an elongated hole 2a formed in the shutter blade 2 and a boss 4b fixedly mounted near the middle of the lever 4 is engaged with an elongated hole 3a formed in the shutter blade 3. Accordingly, when the lever 4 is rotated counter-clockwise around the axis 1c, the boss 4a rotates the shutter blade 2 counter-clockwise around the axis 1a while being engaged with the elongated hole 2a and the boss 4b rotates the shutter blade 3 clockwise around the axis 1a while being engaged with the elongated hole 3a so that the aperture 1b is opened.

The rotatory power of the lever 4 is transmitted from a motor 5. An output pin 5c is provided to an end of a rotating member 5b mounted to a rotary shaft 5a of the motor 5 and is engaged with a notch 4c which is formed in the lever 4 to support the pin 5c. Accordingly, when the output pin 5c is rotated counter-clockwise around the rotary shaft 5a by an angle $\theta$, the shutter blades 2 and 3 are swung so that the aperture 1b is fully opened.

The rotatory power of the lever 4 in the close direction of the aperture is given by a closure driving member not shown. Namely, when the closure driving member is released from a magnet not shown to close the shutter, the closure driving member is moved by, for example, a spring to rotate the lever 4 clockwise.

The shutter blades 2 and 3 are provided with a plurality of slits 2b and 3b, respectively, as an example of detection marks. Every time each of the slits 2b and 3b pass through a photointerrupter 6 provided in a detection point, the photointerrupter 6 is operated.

The present embodiment is characterized by the detection slits 2b and 3b formed in both the shutter blades 2 and 3 to maintain the weight of the shutter blades 2 and 3. In the shutter mechanism shown in FIG. 1, when the shutter starts its movement, the slits 2b are first detected by the photointerrupter 6 and when the movement of the shutter is midway (that is, in the linear area of the opening characteristic curve of FIG. 4), the slits 2b and 3b overlap each other and are both detected by the photointerrupter 6, while when the aperture 1b approaches the fully opened state thereof, the slits 3b are detected by the photointerrupter 6.

In the embodiment, a drive current supplied to the motor 5 is controlled by a pulse oscillator having a variable duty ratio. The duty ratio of the pulse oscillator is controlled in accordance with the time interval of the output signal produced by the photointerrupter 6.

Figure 2:
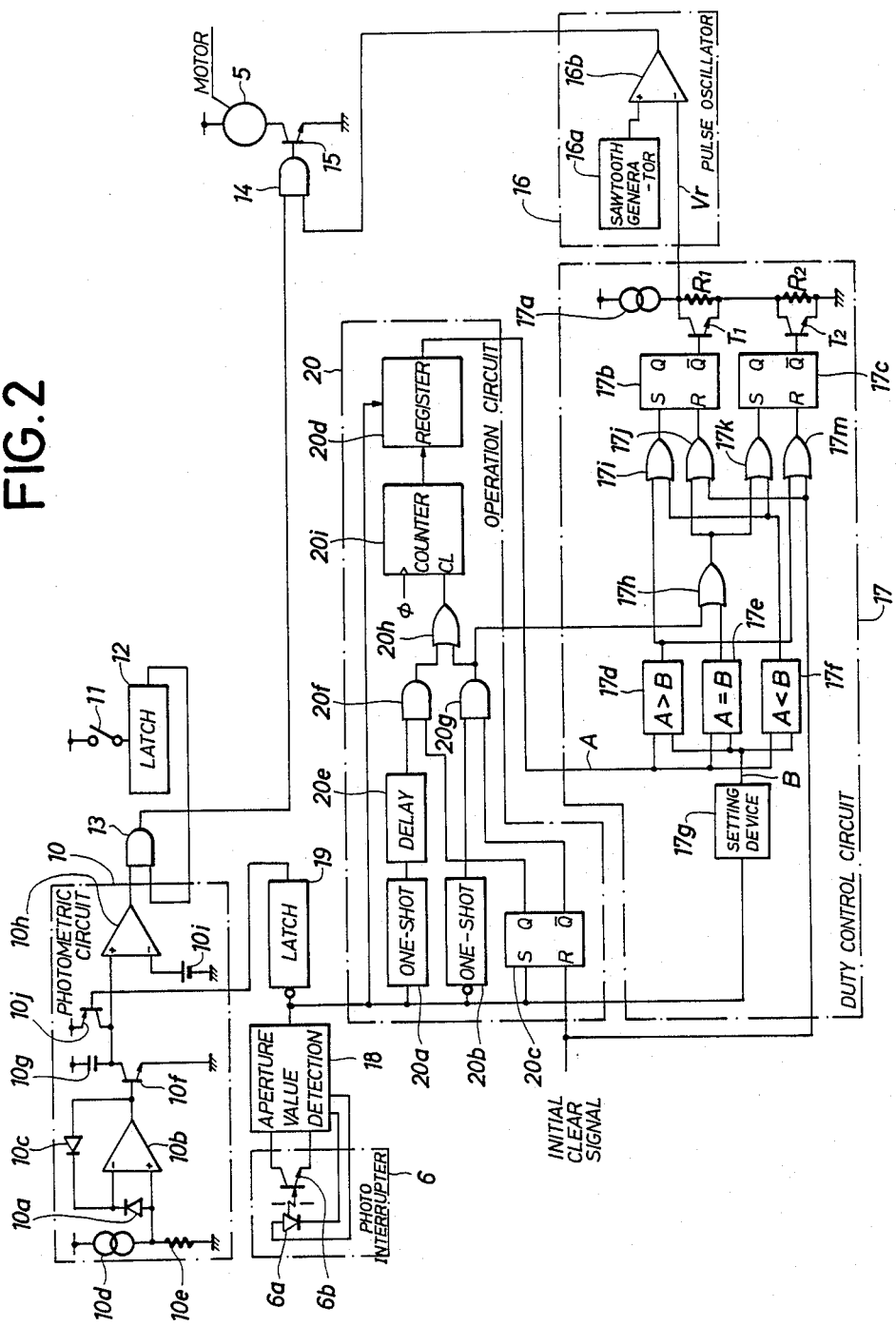
FIG. 2 is a circuit diagram showing a control circuit according to an embodiment of the present invention.

FIG. 2 is an exemplified control circuit of the present invention.

In FIG. 2, reference numeral 10 denotes a known photometric circuit.

A silicon photodiode (hereinafter referred to as SPD) 10a which is an example of a light receiving element is connected between both inputs of an operational amplifier 10b. A logarithmic compression diode 10c is further connected as a feedback resistor of the amplifier 10b. A voltage generated across a resistor 10e when a current flows from a constant current source 10d through the resistor 10e is applied to a non-inverted input of the amplifier 10b as a bias voltage.

Accordingly, when the SPD 10a receives light from a subject to be photographed, a photocurrent corresponding to the brightness of the subject flows through the diode 10c and the SPD 10a and the operational amplifier 10b produces an output voltage having a level obtained by superposing a voltage obtained by logarithmically compressing the photocurrent and the bias voltage.

The output voltage of the amplifier 10b is supplied to a logarithmic expansion transistor 10f and a logarithmically expanded current of the output voltage of the amplifier 10b flows from a collector of the transistor 10f.

Reference numeral 10g denotes a capacitor for integrating light from the subject and which is charged by a collector current of the transistor 10f.

The charged voltage of the capacitor 10g is applied to a non-inverted input of a comparator 10h. An inverted input of the comparator 10h is connected to a reference voltage source 10i. Accordingly, when the capacitor 10g is charged and the voltage of the capacitor 10g is lowered to the reference voltage of the source 10i, the output of the comparator 10h assumes a low level. The timing that the output of the comparator 10h assumes a low level corresponds to an exposure completion timing.

A transistor 10j connected in parallel with the capacitor 10g serves as a switch for starting the charging operation of the capacitor 10g.

Reference numeral 11 denotes a release switch which operates in interlocked relationship with a shutter button not shown. The close operation of the release switch 11 is stored in a latch circuit 12. An output of the latch circuit 12 is applied to an AND gate 13 and an output of the AND gate 13 is applied to an AND gate 14 for controlling the motor 5.

The drive current is supplied to the motor 5 through a switching transistor 15 which is switched by an output of the AND gate 14.

The output of the AND gate 13 applied to the AND gate 14 is a high level until the output of the comparator 10h changes to a low level after the release switch 11 is closed and the latch circuit 12 is set. Accordingly, the output of a pulse oscillator 16 having a variable duty ratio is applied to the switching transistor 15 while the output of the AND gate 13 is a high level.

Accordingly, the motor 5 is driven by pulse current and the duty ratio of the output pulse produced by the pulse oscillator 16 is controlled by a duty control circuit 17 so that the rotational speed of the motor 5 can be controlled.

The pulse oscillator 16 comprises a saw-tooth generator 16a which produces a saw-tooth wave signal and a comparator 16b which compares the saw-tooth wave signal with a reference level Vr. The duty control circuit 17 adjusts the reference level Vr to control the duty ratio of the pulse produced by the oscillator 16.

A constant current source 17a, resistors $R_1$ and $R_2$ and switching transistors $T_1$ and $T_2$ which are provided in an output stage of the duty control circuit 17 form a voltage addition circuit and a resistance value of the resistor $R_2$ is sufficiently larger than a resistance value of the resistor $R_1$. Thus, combination of the on and off states of the transistors $T_1$ and $T_2$ determines the reference level Vr applied to the comparator 16b.

More particularly, the reference level Vr is Vro of FIG. 3 when the transistors $T_1$ and $T_2$ are both on, the level Vr is $Vr_1$ when only transistor $T_2$ is on, the level Vr is $Vr_2$ when only transistor $T_1$ is on, and the level Vr is $Vr_3$ when transistors $T_1$ and $T_2$ are both on.

The output of the comparator 16b is a high level when the output waveform of the saw-tooth generator shown in FIG. 3 exceeds the reference level Vr. Accordingly, the duty ratio of the output pulse of the oscillator 16b is 100% when the transistors $T_1$ and $T_2$ are both on, the duty ratio is a reference duty ratio when only the transistor $T_1$ is on, the duty ratio is increased as compared with the reference duty ratio when only the transistor $T_2$ is on and the duty ratio is decreased as compared with the reference duty ratio when the transistors $T_1$ and $T_2$ are both off.

The transistors $T_1$ and $T_2$ are controlled by $\overline{Q}$ outputs of flip-flops 17b and 17c, respectively. The state of the flip-flops 17b and 17c are determined in accordance with the time interval of the detected slits 2b and 3b by the photointerrupter 6.

A light emitting diode 6a and a phototransistor 6b forming the photointerrupter 6 is connected to an aperture value detection circuit 18. The aperture value detection circuit 18 comprises a known circuit element which supplies a drive current to the light emitting diode 6a and a known circuit element which shapes an output of the phototransistor 6b to produce a pulse.

A detection pulse produced from the aperture value detection circuit 18 is applied to a latch circuit 19 which is set by a first negative going edge of the detection pulse. When the output of the latch circuit 19 changes to a high level, the switching transistor 10j is turned off and the capacitor 10g begins to be charged.

The detection pulse produced from the aperture value detection circuit 18 is applied to trigger inputs of one-shot circuits 20a and 20b, a set input of a flip-flop 20c and a trigger input of a register 20d of an operation circuit 20.

The one-shot circuit 20a produces a pulse in response to a positive going edge of the detection pulse from the aperture value detection circuit 18 and the one-shot circuit 20b produces a pulse in response to a negative going edge of the detection pulse from the detection circuit 18. The pulse produced from the one-shot circuit 20a is delayed by a delay circuit 20e and applied to an AND gate 20f and the pulse produced from the one-shot circuit 20b is applied to an AND gate 20g. One of the AND gates 20f and 20g is selected by an output of the flip-flop 20c and the outputs of the AND gates 20f and 20g are applied to a clear input of a counter 20i through an OR gate 20h.

A reference pulse φ is applied to a count-up input of the counter 20i and the counter 20i counts the reference pulse φ while being cleared by the output of the OR gate 20h periodically. The count of the counter 20i is supplied to the register 20d which stores the count of the counter 20i at a timing of a positive going edge of the detection pulse produced by the aperture value detection circuit 18.

Accordingly, an output value A of the register 20d represents the pulse interval of the detection pulse and is applied to comparators 17d, 17e and 17f of the duty control circuit 17.

A reference time B stored in the setting device 17g is applied to other inputs of the comparators 17d, 17e and 17f. The reference time B represents the pulse interval (for example, 5 ms) of the detection pulse in the case where the shutter blades 2 and 3 are moved at a desired speed.

The output of the comparator 17d assumes a high level when the output value A of the register 20d is larger than the reference time B. The output of the comparator 17e assumes a high level when the output value A is equal to the reference time B. The output of the comparator 17f assumes a high level when the output value A is smaller than the reference time B. The outputs of the comparators 17d, 17e and 17f are supplied through a gate group composed of OR gates 17h, 17i, 17j, 17k and 17m to the flip-flops 17b and 17c to determine the states of the flip-flops 17b and 17c.

Figure 5:
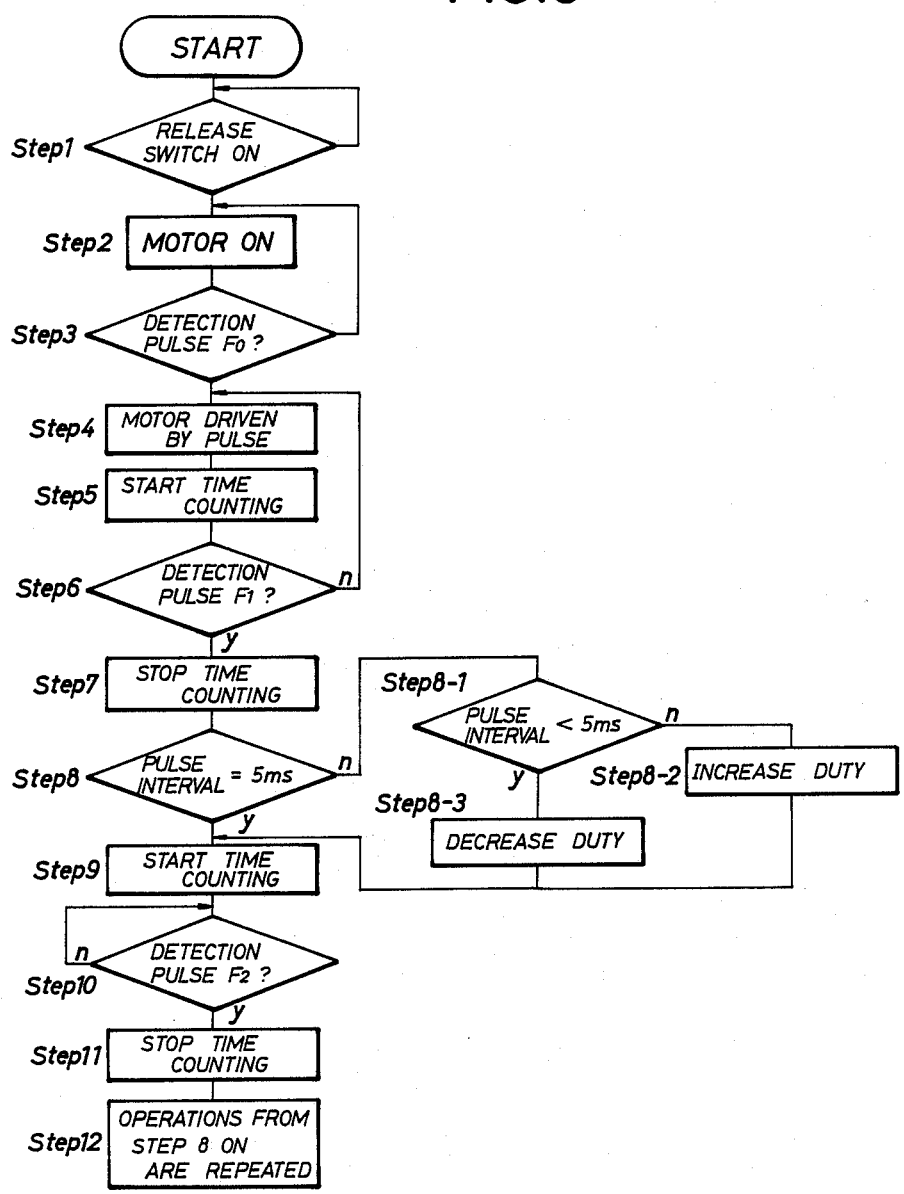
FIG. 5 is a flowchart showing the principle of operation of the present invention.
Figure 6:
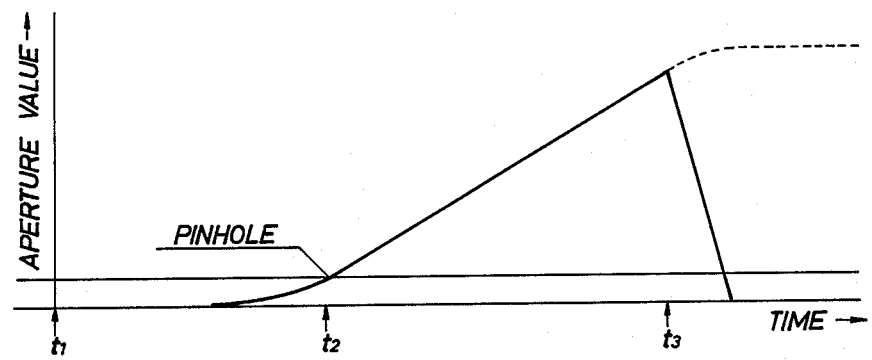
FIG. 6 graphically illustrates an opening characteristic of a general programming shutter.

Operation of the embodiment is now described with reference to the foregoing description, the time chart of FIG. 4 and the flowchart of FIG. 5.

In the initial state, the shutter mechanism is in the state shown in FIG. 1 and the flip-flops 17b, 17c and 20c are all reset by an initial clear signal produced upon turning-on of a main power source not shown and completion of the last photographic operation.

Accordingly, since both of the transistors $T_1$ and $T_2$ conduct and the reference level of the comparator 16b is Vro of FIG. 3, the comparator 16b produces pulses having a duty ratio of 100%. In other words, the output of the comparator 16b is maintained to a high level which is applied to the AND gate 14.

On the other hand, since the latch circuit 12 is not set at this time, the output of the AND gate 13 is a low level and the output of the AND gate 14 is also a low level. Accordingly, the transistor 15 is cut off and the drive current is not applied to the motor 5.

At the time $t_a$ of FIG. 4, when the release switch 11 is closed in interlocked relationship with the shutter button not shown, the latch circuit 12 is set and the output of the AND gate 13 changes to a high level. Since the output of the comparator 16b assumes a high level, the output of the AND gate 14 also assumes a high level and the transistor is turned on to drive the motor 5 by a dc current. Accordingly, in FIG. 1, the output pin 5c of the motor 5 is rotated clockwise and the opening and closing lever 4 is rotated counter-clockwise.

Accordingly, the shutter blade 2 is rotated counter-clockwise and at the same time the shutter blade 3 is rotated clockwise so that the opening operation of the aperture 1b starts.

At this time, since the motor 5 is driven by a dc current, the motive power required at the initial operation is secured.

Since the optical path between the light emitting diode 6a and the photo-transistor 6b forming the photointerrupter 6 is not blocked by the shutter blades 2 and 3 at the time of the initial operation, the output of the aperture detection circuit 18 is a high level. When the shutter blades 2 and 3 are swung, the shutter blade 2 blocks the optical path of the photointerrupter 6 at the time $t_b$ of FIG. 4. Consequently, the output of the aperture value detection circuit 18 changes to a low level and a negative going edge thereof is supplied to the latch circuit 19 and the one-shot circuit 20b as a detection pulse Fo.

When the latch circuit 19 is set, the transistor 10j is cut off by the output of the latch circuit 19 and the capacitor 10g begins to be charged.

The one-shot circuit 20b produces a pulse having a short width in response to the negative going edge of the detection pulse Fo. At this time, since the flip-flop $20c$ is still reset, the pulse produced by the one-shot circuit $20b$ is applied to the OR gates $20h$ and $17h$ through the AND gate $20g$.

The counter $20i$ is cleared by the pulse passing through the OR gate $20h$ and counts the reference pulses $\phi$ starting from the time when cleared.

The pulse passing through the OR gate $17h$ resets the flip-flop $17b$ through the OR gate $17j$ and sets the flip-flop $17c$ through the OR gate $17k$.

Consequently, the transistor $T_2$ is cut off and the reference level of the comparator $16b$ is $Vr_2$ of FIG. 3 so that the comparator $16b$ produces pulses having the reference duty ratio to switch on and off the transistor 15. Accordingly the motor 5 is driven by the current interrupted in response to the reference duty ratio.

The shutter blades 2 and 3 continue the opening operation thereof, and when the aperture value detection circuit 18 produces a detection pulse $F_1$ at the time $t_c$ of FIG. 4, the register $20d$ stores the count of the counter $20i$ in response to the positive going edge of the detection pulse $F_1$.

Since the counter $20i$ is counting the reference pulse $\phi$ produced after cleared at the time $t_b$, the count thereof indicates the time interval between the time $t_b$ and $t_c$. Accordingly, during the period between the time $t_c$ and $t_d$, the output value A of the register $20d$ indicates the time interval between the time $t_b$ and $t_c$.

The output value A of the register $20d$ is compared with the reference time B stored in the setting device $17g$ in the comparators $17d$, $17e$ and $17f$.

As shown in FIG. 4, the time interval between the time $t_b$ and $t_c$ is 5 ms, and when this time interval is equal to the time interval B, the output of the comparator $17e$ assumes a high level at the time $t_c$.

Accordingly, since the flip-flop $17b$ is reset and the flip-flop $17c$ is set, the comparator $16b$ produces the pulses having the reference duty ratio and the motor 5 is also driven by the current interrupted in response to the reference duty ratio.

The detection pulse $F_1$ produced by the aperture value detection circuit 18 at the time $t_c$ of FIG. 4 is applied to the trigger input of the one-shot circuit $20a$ and the set input of the flip-flop $20c$.

The one-shot circuit $20a$ produces a pulse in response to a positive going edge of the detection pulse $F_1$. The delay circuit $20e$ produces a pulse delayed by a predetermined time with respect to the output pulse of the one-shot circuit $20a$. The delay time of the delay circuit $20e$ is determined in accordance with a setup time required to store the output of the counter $20i$.

Since the flip-flop $20c$ has been set by the positive going edge of the detection pulse $F_1$, the pulse produced from the delay circuit $20e$ is applied to the clear input of the counter $20i$ through the AND gate $20f$ and the OR gate $20h$ to clear the counter $20i$.

Accordingly, the counter $20i$ counts the reference pulses $\phi$ starting from the time when cleared in this manner.

Each time the aperture value detection circuit 18 produces detection pulses $F_2$, $F_3$, $F_4$ and $F_5$ at the times $t_a$, $t_e$, $t_f$ and $t_g$ of FIG. 4, respectively, in the same manner, the one-shot circuit $20a$ produces the pulses. After the one-shot circuit $20e$ produces the pulses, the counter $20i$ is cleared by the pulse produced from the delay circuit $20e$.

Since the register $20d$ stores the count of the counter $20i$ just before the counter $20i$ is cleared by the output pulse of the delay circuit $20e$, the output value A of the register $20d$ indicates the time interval between the detection pulses.

The output value A of the register $20d$ is compared with the reference time B stored in the setting device $17g$ and the duty ratio of the pulse produced by the comparator $16b$ is controlled in accordance with the comparison result.

Description is made in detail with reference to FIG. 4.

When the time interval between the detection pulses $F_1$ and $F_2$ is shorter than the reference time B and is, for exampe, 4ms, the output of the comparator $17f$ assumes a high level. Accordingly, the flip-flops $17b$ and $17c$ are both set and the reference level of the comparator $16b$ is $Vr_3$ of FIG. 3. The comparator $16b$ produces pulses having a duty ratio smaller than the reference duty ratio and the rotational speed of the motor 5 is decreased. Further, when the time interval between the detection pulses $F_3$ and $F_4$ is longer than the reference time B and is, for example, 6ms, the output of the comparator $17d$ assumes a high level. Accordingly, since the flip-flop $17b$ is set and the flip-flop $17c$ is reset, the reference level of the comparator $16b$ is $Vr_1$ of FIG. 3. The comparator $16b$ produces pulses having a duty ratio larger than the reference duty ratio and the rotational speed of the motor 5 is increased.

In this manner, according to the present embodiment, each time the aperture value detection circuit 18 produces the detection pulse, the pulse interval is compared with the predetermined reference time and the rotational speed of the motor 5 is controlled until the next detection pulse is produced.

On the other hand, as described above, the capacitor $10g$ starts the integration operation of light from the subject at the time $t_b$ of FIG. 4. When the charged level of the capacitor $10g$ is reduced to the reference level of the reference power source $10i$, the output of the comparator $10h$ changes to a low level.

When the output of the comparator $10h$ changes to a low level, the magnet holding the closure driving member of the shutter is deenergized and the closure driving member is moved by a driving mechanism such as a spring so that the opening and closing lever 4 of FIG. 1 is rotated clockwise and the shutter blades 2 and 3 are returned to the initial position to finish the exposure operation.

Further, when the output of the comparator $10h$ changes to a low level, the outputs of the AND gates 13 and 14 also change to a low level and the transistor 15 is cut off to deenergize the motor 5. Accordingly, the load applied to the spring for closure of the shutter from the motor is light and the closing speed of the shutter can be maintained even if a large spring is not used.

While the above embodiment describes the case where the reference time stored in the setting device $17g$ is 5ms, a reference time suitable for each detection pulse can be successively read out if the setting device $17g$ is formed of a memory having a plurality of addresses. In this case, it is a matter of course that the address of the setting device $17g$ is successively updated for each detection pulse, for example.

As described above, according to the present invention, since the rotational speed of the motor until the next detection pulse is produced in accordance with the pulse interval of the detection pulse produced for each detection mark can be corrected, a desired opening characteristic of the shutter can be attained easily even if there is not provided a complicated mechanism for stabilizing the opening characteristic of the shutter blades. Further, since the control operation required for the speed control is only the simple duty control, a high degree servo system is not required.

In addition, in the case where the duty ratio of the drive current at the beginning of opening is 100%, the sufficient motive power required at the initial operation can be secured even if a large motor is not used.

Furthermore, when the setting device 17g is formed of a memory having a plurality of addresses and a reference time suitable for each detection pulse is successively read from the memory, the opening characteristic curve can be established to a desired curve.

What is claimed is:

1. An aperture control apparatus of a programming shutter including a motor which is rotated by supplying a current thereto and shutter blades which function as diaphragm blades and which are connected to the motor to open an exposure aperture when the rotation of the motor is transmitted to the shutter blades, comprising:

a plurality of detection marks disposed on at least one of said shutter blades along a moving direction of said shutter blades to detect a position of said shutter blades;

an aperture value detection means for producing a detection pulse every time each of said plurality of detection marks passes through a predetermined detection point provided on a traveling path of said plurality of detection marks;

a means for calculating a pulse interval of said detection pulses produced by said aperture value detection means each time said detection pulses are supplied thereto;

a photometric means which is charged by photocurrent corresponding to the brightness of a subject to be photographed for producing an exposure ending signal when the charged level thereof reaches a predetermined level;

a pulse oscillator for producing a pulse signal having a variable duty ratio for controlling turning on and off of a drive current of said motor;

a gate means for passing said pulse signal produced by said pulse oscillator within a period of time from when a shutter release operation has been effected to when said exposure ending signal is produced by said photometric means; and a duty cycle control means for controlling the duty cycle ratio of said pulse signal which is produced by said pulse oscillator in accordance with the pulse interval of the detection pulses calculated by said calculating means;

wherein said detection point is provided at a point where said aperture value detection means produces a first detection pulse before said shutter blades form a pinhole, and wherein said photometric means starts being charged when said first detection pulse is produced.

2. An aperture control apparatus of a programming shutter according to claim 1, wherein said duty cycle control means comprises a setting device which stores a reference time and a means for comparing the pulse interval of the detection pulses calculated by said calculating means with the reference time stored in said setting device, and wherein when the detected pulse interval is longer than the reference time, the duty cycle ratio of said pulse signal which is produced by said pulse oscillator is increased and wherein when the detected pulse interval is shorter than the reference time, the duty cycle ratio of said pulse signal which is produced by said pulse oscillator is decreased.

3. An aperture control appartus of a programming shutter according to claim 1, wherein said duty cycle control means maintains the duty cycle ratio of said pulse signal which is produced by said pulse oscillator at 100% until said first detection pulse is produced.

4. An aperture control apparatus of a programming shutter according to claim 2, wherein said duty cycle control means maintains the duty cycle ratio of said pulse signal which is produced by said pulse oscillator at 100% until said first detection pulse is produced.

5. An aperture control apparatus of a programming shutter according to claim 2, wherein said setting device comprises a memory having a plurality of addresses, and wherein each time said detection pulse is produced, reference times which have been stored in said plurality of addresses are successively read out.

6. An aperture control apparatus of a programming shutter according to claim 4, wherein said setting device comprises a memory having a plurality of addresses, and wherein each time said detection pulse is produced, reference times which have been stored in said plurality of addresses are successively read out.

* * * * *